United States Patent
Li

(10) Patent No.: US 8,626,221 B2
(45) Date of Patent: Jan. 7, 2014

(54) METHOD, BASE STATION, BASE STATION CONTROLLER AND SYSTEM FOR SETTING UP RADIO LINK

(75) Inventor: Yi Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/367,971

(22) Filed: Feb. 7, 2012

(65) Prior Publication Data

US 2012/0135769 A1 May 31, 2012

Related U.S. Application Data

(63) Continuation of application No. PCT/CN2010/075796, filed on Aug. 9, 2010.

(30) Foreign Application Priority Data

Aug. 7, 2009 (CN) .......................... 2009 1 0090820

(51) Int. Cl.
*H04W 88/02* (2009.01)
(52) U.S. Cl.
USPC ......................................................... 455/509
(58) Field of Classification Search
USPC ................. 370/328, 235, 242, 252, 329, 349;
455/418, 436, 441, 445, 509, 561;
717/168; 375/260, 329
See application file for complete search history.

(56) References Cited

U.S. PATENT DOCUMENTS

| | | |
|---|---|---|
| 6,996,401 B2 | 2/2006 | Agin |
| 7,130,640 B2 | 10/2006 | Agin |
| 2002/0119784 A1 | 8/2002 | Agin |
| 2002/0119785 A1 | 8/2002 | Agin |
| 2006/0089150 A1 | 4/2006 | Agin |
| 2008/0198831 A1 | 8/2008 | Zhang et al. |

(Continued)

FOREIGN PATENT DOCUMENTS

| | | |
|---|---|---|
| CN | 1917661 A | 2/2007 |
| CN | 101127725 A | 2/2008 |
| CN | 101222773 A | 7/2008 |

(Continued)

OTHER PUBLICATIONS

PCT International Search Report of the International Searching Authority; dated (mailed) Nov. 18, 2010, related to Application No. PCT/CN2010/075796, Huawei Technologies Co., Ltd. et al.
PCT Written Opinion of the International Searching Authority; dated (mailed) Nov. 18, 2010, related to Application No. PCT/CN2010/075796, Huawei Technologies Co., Ltd. et al.

*Primary Examiner* — Diane Mizrahi
(74) *Attorney, Agent, or Firm* — Slater & Matsil, L.L.P.

(57) ABSTRACT

A method, a base station, and a base station controller for setting up a radio link is provided. The method includes: sending a message to a base station controller, where the message includes channel element consumption rules of a new board and an old board in a base station (101); and instructing the base station controller to set up a radio link according to the channel element consumption rule of the old board when determining that the actual number of assignable channel elements of the old board does not satisfy a radio link setup request sent according to the channel element consumption rule of the new board by the base station controller (102). The present invention can effectively ensure the uniformity of the channel elements maintained by the base station and the base station controller when both of new and old baseband boards exist in the base station.

20 Claims, 6 Drawing Sheets

(56) References Cited

U.S. PATENT DOCUMENTS

| | | |
|---|---|---|
| 2012/0135769 A1 | 5/2012 | Li |
| 2012/0207133 A1* | 8/2012 | Wong .......................... 370/331 |
| 2012/0275403 A1* | 11/2012 | Zhang et al. ................ 370/329 |
| 2012/0287869 A1* | 11/2012 | Xi et al. ..................... 370/329 |
| 2013/0094385 A1* | 4/2013 | Gunnarsson et al. ......... 370/252 |

FOREIGN PATENT DOCUMENTS

| | | |
|---|---|---|
| CN | 101631362 A | 1/2010 |
| CN | 1859658 A | 11/2011 |

\* cited by examiner

METHOD, BASE STATION, BASE STATION CONTROLLER AND SYSTEM FOR SETTING UP RADIO LINK

CROSS-REFERENCE TO RELATED APPLICATIONS

This application is a continuation of International Application No. PCT/CN2010/075796, filed on Aug. 9, 2010, which claims priority to Chinese Patent Application No. 200910090820.3, filed on Aug. 7, 2009, both of which are hereby incorporated by reference in their entireties.

FIELD OF THE INVENTION

The present invention relates to the field of communications technologies, and in particular, to a method, a base station, a base station controller and a system for setting up a radio link.

BACKGROUND OF THE INVENTION

In a WCDMA system, a NodeB (base station of the WCDMA system) performs signaling interaction with an RNC (Radio Network Controller, radio network controller or base station controller) to enable the RNC to learn resources and capabilities of the NodeB, and set up, add or reconfigure a radio link according to the resources and capabilities.

After establishing a local cell, the NodeB actively initiates a resource status indication message, in order to notify the RNC of resources and capabilities established by the NodeB in the cell. The message includes an HSUPA (High Speed Uplink Packet Access, high speed uplink packet access) E-DCH (Enhanced Dedicated Channel, enhanced dedicated channel) capability consumption rule, that is, an E-DCH CE (Channel Element, channel element) consumption rule. According to the resource status indication message reported by the NodeB, the RNC sets a GBR (Guaranteed BitRate, guaranteed bit rate) of a radio link that is to be set up or reconfigured, and initiates a radio link setup, addition or reconfiguration process.

When the resources and capabilities of the NodeB change, the NodeB actively requests the RNC to initiate an audit request message used for auditing the changed resources and capabilities of the NodeB, or when the RNC detects that resources and capabilities of the NodeB which are maintained by itself are not consistent with those reported by the NodeB side or are abnormal, the RNC actively initiates an audit request message to the NodeB, and the NodeB reports the changed resources and capabilities through an audit response message in response to the audit request message initiated by the RNC, where an HSUPA E-DCH capability consumption rule is included.

However, when mixed insertion of new and old baseband boards occurs in the NodeB, as the new and old baseband boards have different E-DCH CE consumption rules, a problem that which E-DCH CE consumption rule is used for reporting to the RNC arises. Currently, a solution to this problem is mainly: the NodeB selects an E-DCH CE consumption rule for reporting, according to the principle of highest processing capability. For example, generally, the new baseband board has a higher processing capability than the old baseband board, and consumes less CEs under the same SF (Spread Factor, spread factor); therefore, the CE consumption rule of the new baseband board is used for reporting to the RNC. The RNC maintains a set of CE resource use status of the NodeB according to the received CE consumption rule, mainly including the number of consumed CEs and the number of remaining CEs.

The inventor finds that the prior art has at least the following problems: when mixed insertion of new and old baseband boards occurs in the NodeB, as the CE consumption rule maintained by the RNC side is not completely consistent with the CE consumption rules in the NodeB side of different baseband boards, a problem of false admission of the RNC side arises as the number of accessing users increases.

SUMMARY OF THE INVENTION

Embodiments of the present invention provide a method, a base station, a base station controller and a system for setting up a radio link, which can effectively ensure the uniformity of channel element resources maintained by the base station side and the base station controller side, thereby avoiding the problem of false admission of a base station controller side in the prior art which results from accumulative errors caused by inconsistency of channel elements maintained by the base station controller side and the base station side.

A method (1) for setting up a radio link provided in an embodiment of the present invention includes:

sending a message to a base station controller, where the message includes channel element consumption rules of a new baseband board and an old baseband board in a base station; and instructing the base station controller to set up a radio link according to the channel element consumption rule of the old baseband board when determining that the actual number of assignable channel elements of the old baseband board does not satisfy a radio link setup request sent according to the channel element consumption rule of the new baseband board by the base station controller.

A base station provided in an embodiment of the present invention includes:

a message processing module, configured to send a message to a base station controller, where the message includes channel element consumption rules of a new baseband board and an old baseband board in the base station; and a request response module, configured to instruct the base station controller to set up a radio link according to the channel element consumption rule of the old baseband board when determining that the actual number of assignable channel elements of the old baseband board does not satisfy a radio link setup request sent according to the channel element consumption rule of the new baseband board by the base station controller.

A method (2) for setting up a radio link provided in an embodiment of the present invention includes:

receiving a message from a base station, where the message includes channel element consumption rules of a new baseband board and an old baseband board in the base station; and receiving, from the base station, a notification used to notify that the actual number of assignable channel elements of the old baseband board does not satisfy a radio link setup request sent according to the channel element consumption rule of the new baseband board, and setting up a radio link according to the channel element consumption rule of the old board.

A base station controller provided in an embodiment of the present invention includes:

a receiving and processing module, configured to receive a message from a base station, where the message includes channel element consumption rules of a new baseband board and an old baseband board in the base station; and a request monitoring module, configured to receive, from the base station, a notification used to notify that the actual number of assignable channel elements of the old baseband board does not satisfy a radio link setup request sent according to the channel element consumption rule of the new baseband board, and set up a radio link according to the channel element consumption rule of the old board.

A method (3) for setting up a radio link provided in an embodiment of the present invention includes:

sending, by a base station, a message to a base station controller, where the message includes channel element consumption rules of a new baseband board and an old baseband board in the base station; and setting up, by the base station controller, a radio link according to the channel element consumption rule of the old baseband board upon receiving a notification that is sent from the base station and is used to notify that the actual number of assignable channel elements of the old baseband board does not satisfy a radio link setup request sent according to the channel element consumption rule of the new baseband board.

A communication system provided in an embodiment of the present invention includes:

the base station described above and the base station controller described above.

A method for setting up a radio link provided in an embodiment of the present invention includes:

receiving a radio link setup request sent according to a channel element consumption rule of a new baseband board by a base station controller;

determining that the radio link setup request sent according to the channel element consumption rule of the new baseband board or an old baseband board by the base station controller is satisfied; and sending a setup success response to the base station controller, where the setup success response includes the actual number of channel elements consumed when channel elements of the new baseband board or the old baseband board are used for radio link setup, so that the base station controller uses the actual number of channel elements to replace the theoretical number of channel elements in the radio link setup request, and obtains the actual number of remaining assignable channel elements.

It can be seen from the technical solutions provided in the embodiments of the present invention that, by implementing the technical solutions disclosed in the embodiments of the present invention, the uniformity of CE resources maintained by the NodeB side and the RNC side can be effectively ensured, thereby avoiding the problem of false admission of the RNC which results from accumulative errors caused by inconsistency of the CE consumption rule maintained by the RNC and the CE consumption rules of new and old baseband boards in the base station.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions according to the embodiments of the present invention will be clearly and comprehensively described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In the prior art of the embodiments of the present invention, when mixed insertion of new and old baseband boards occurs in a NodeB, the NodeB generally needs to select a CE consumption rule of the new baseband board (referred to as new board for short below, the old baseband board being referred to as old board for short below) for reporting to an RNC, according to the principle of highest processing capability; an RNC side may maintain the CE consumption rule of the new board, and deliver a radio link setup request to the NodeB according to the CE consumption rule of the new board. As the CE consumption rules of the new and old baseband boards are not consistent, when the RNC uses resources of the old board in the NodeB to set up a radio link, a problem of mismatching of the CE consumption rule of the new board and CEs of the old board exists, resulting in false admission of the RNC side. In view of the problem in the prior art, the embodiments of the present invention provide a method, a base station and a base station controller for setting up a radio link, which can effectively ensure the uniformity of CE resources maintained by the NodeB side and the RNC side, thereby desirably solving the problem in the prior art.

To make the technical solutions of specific embodiments of the present invention more comprehensible, the technical solutions are described in detail below.

Figure 1:
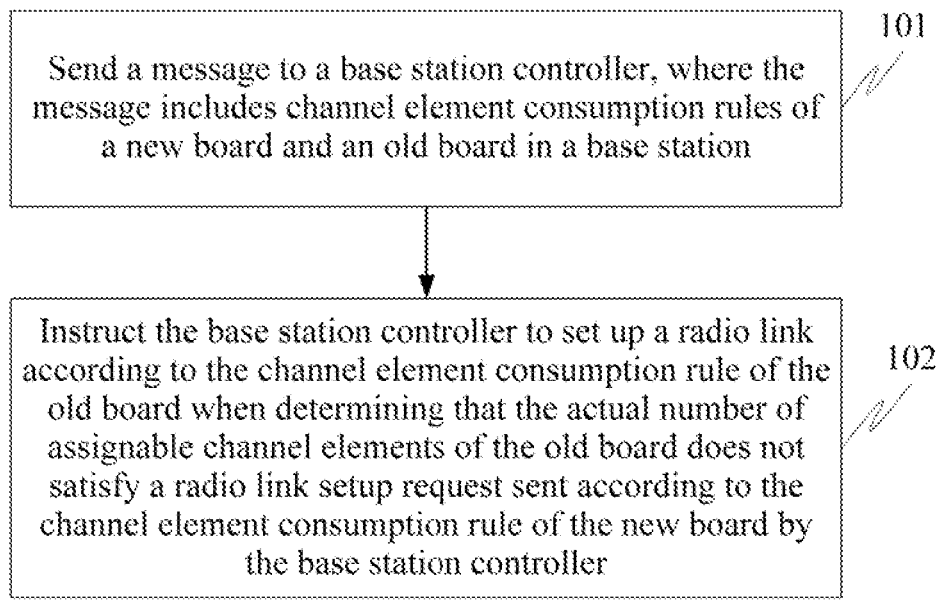
FIG. 1 is a flowchart of a method (1) for setting up a radio link according to a specific embodiment of the present invention.

As shown in FIG. 1, a specific embodiment of the present invention provides a method (1) for setting up a radio link from the view of a base station. The method may include the following steps.

Step 101: Send a message to a base station controller, where the message includes channel element consumption rules of a new board and an old board in a base station.

Step 102: Instruct the base station controller to set up a radio link according to the channel element consumption rule of the old board when determining that the actual number of assignable channel elements of the old board does not satisfy a radio link setup request sent according to the channel element consumption rule of the new board by the base station controller.

In an implementation scenario, the specific process of step 101 may include:

(1) generating an audit response message that includes the channel element consumption rules of the new board and the old board and is in response to an audit request message received from the base station controller; or generating a resource status indication message including the channel element consumption rules of the new board and the old board after a local cell is established; and (2) sending the audit response message or the resource status indication message to the base station controller.

Specifically, the resource status indication message is a report message used by the base station to notify the base station controller of resources and capabilities established in the local cell after the local cell is established, and the base station controller delivers a radio link setup request to the base station according to the resources and capabilities reported by the base station.

The audit response message is a response message in response to a received audit request message initiated by the base station controller. A process of sending the audit request message is as follows: when the resources and capabilities of the NodeB change, the NodeB actively requests the RNC to send an audit request message used for auditing the changed resources and capabilities of the NodeB, so that the RNC obtains the latest resources and capabilities of the NodeB, and sets up a radio link according to the latest resources and capabilities; or when resources and capabilities maintained by the RNC are not consistent with those reported by the NodeB, the RNC actively sends an audit request message to the NodeB, so as to obtain the latest resources and capabilities of the NodeB.

In an implementation scenario, after step 101 is completed, generally, a radio link setup request sent by the base station controller is received, where the request includes the theoretical number of channel elements required to be consumed for radio link setup and the theoretical number is determined according to the channel element consumption rule of the new board.

In an implementation scenario, the specific process of step 102 may include:

judging, according to the received radio link setup request sent according to the channel element consumption rule of the new board by the base station controller, whether the actual number of assignable channel elements of the old board satisfies the theoretical number of channel elements in the radio link setup request (that is, whether to satisfy the radio link setup request), and when determining, according to the channel element consumption rule of the old board, that the actual number of channel elements required to be consumed for radio link setup is larger than the number of assignable channel elements of the old board, sending a setup failure response to the base station controller, where the setup failure response may carry the actual number of channel elements required to be consumed for radio link setup and a setup failure cause being insufficient channel elements of the old board, so as to instruct the base station controller to set up a radio link according to the channel element consumption rule of the old board.

Further, the method according to the embodiment of the present invention may further include:

when determining, according to the channel element consumption rule of the new board or the old board, that the actual number of channel elements of the new board or the old board, where the channel elements are required to be consumed for radio link setup, is smaller than or equal to the actual number of assignable channel elements of the new board or the old board, determining that the radio link setup request sent according to the channel element consumption rule of the new board or the old board by the base station controller is satisfied; and sending a setup success response to the base station controller, where the setup success response includes the actual number of channel elements consumed when channel elements of the new board or the old board are used for radio link setup, so that the base station controller uses the actual number of channel elements to replace the theoretical number of channel elements in the radio link setup request, and obtains the actual number of remaining assignable channel elements.

Specifically, as the NodeB carries the channel element consumption rules of the new board and the old board through the resource status indication message or the audit response message, the RNC side maintains new and old CE consumption rules. According to the principle of highest processing capability, the RNC preferentially initiates a radio link setup request to the NodeB according to the CE consumption rule of the new board. Upon receiving the radio link setup request, the base station side preferentially uses CEs of the new board, and makes a determination regarding CE resources of the new board or the old board in the base station, so as to determine whether the CE resources of the new board or the old board in the base station satisfy the setup request. In an implementation scenario, the base station determines the actual number of CEs, which are required to be consumed, of the new board or the old board for radio link setup, according to the actual number of assignable CEs of the new board or the old board in the base station on the basis of the CE consumption rule of the new board or the old board; compares the actual number of CEs, which are required to be consumed, of the new board or the old board with the actual number of assignable CEs of the new board or the old board in the base station, and when the actual number of CEs required to be consumed is smaller than or equal to the actual number of assignable CEs of the new board or the old board in the base station, that is, the actual number of assignable CEs are sufficient for the radio link setup, it indicates that the radio link setup request is satisfied, and then a setup success response is sent to the base station controller.

For example, the base station delivers, to the base station, a setup request of adding an SF16 radio link, according to the CE consumption rule of the new board. The base station preferentially uses CEs of the new board (there are five CEs on the new board) for setup. As CE resources of the new board match the CE consumption rule of the new board, the base station determines, according to the CE consumption rule of the new board, that the actual number of CEs consumed is 4, which is equal to the theoretical number being 4 in the setup request. As the actual number of assignable resources of the new board in the base station satisfies the setup request, the problem of accumulative errors of resources does not occur. The base station feeds back, to the base station controller, a setup success response message carrying the actual number of CEs consumed for setup of SF16, where the actual number is 4.

Specifically, when all CEs of the new board are consumed and CEs of the old board start to be used for radio link setup, the base station controller can only learn the number of remaining channel elements but does not learn the specific assignment of CEs of the new board and the old board, so that when the base station uses CEs of the old board for radio link setup according to the CE rule of the new board, as the processing capability of CEs of the old board is weaker than that of CEs of the new board, the actual number of CEs consumed during radio link setup is larger than the theoretical number of CEs determined according to the CE rule of the new board. Specifically, the following two cases may be included.

(1) When the base station controller sends a radio link setup request to the base station according to the CE consumption rule of the new board, if the actual number of CEs required to be consumed, where the actual number of CEs is determined by the base station according to the CE consumption rule of the old board, is smaller than or equal to the actual number of assignable channel elements of the old board in the base station, the number of CEs required to be consumed in the setup request is satisfied as the number of remaining CEs of the old board is large enough. In this case, the base station feeds back a setup success response to the base station controller, and carries the actual number of consumed CEs in the message, so as to ensure that the base station controller side can obtain the actual remaining number.

For example, the number of CEs of the old board in the base station is 3, the base station controller delivers, to the base station, a setup request of adding an SF32 radio link, and the base station determines, according to the CE consumption rule of the old board, that the actual number of CEs required to be consumed is 3, which is larger than the theoretical number of CEs that is 2 in the setup request and is determined according to the CE consumption rule of the new board, and is equal to the number of CEs of the old board being 3 in the base station, so that the setup request can be satisfied. In this case, a setup success response carrying the actual number of CEs consumed for setup of SF32 is sent to the base station controller, where the actual number is 3.

(2) When the base station controller delivers a radio link setup request according to the number of remaining CEs maintained by the base station controller and according to the CE consumption rule of the new board, the base station determines, according to the CE consumption rule of the old board, the actual number of CEs required to be consumed for radio link setup, and when judging that the actual number of CEs required to be consumed is larger than the actual number of assignable CEs of the old board, determines that CEs of the old board are insufficient, and sends a setup failure response to the base station controller, where the setup failure response carries the actual number of channel elements and a failure cause being insufficient channel elements of the old board. After receiving the setup failure response, the base station controller determines that the failure cause is insufficient CE resources of the old board, and delivers a radio link setup request to the base station according to the CE consumption rule of the old board maintained by the base station controller. In this way, the uniformity of resources of the base station side and the RNC side is ensured, thereby avoiding introduction of accumulative errors.

For example, the number of remaining CEs maintained by the base station controller side is 4, and the base station controller sends, to the base station, a request of adding an SF16 radio link, according to the number of remaining CEs and according to the CE consumption rule of the new board. After receiving the request, the base station determines, according to the CE consumption rule of the old board, that the number of channel elements required to be consumed for setup of SF16 is 6, which is larger than the theoretical number being 4 in the request, and is larger than the actual number of remaining assignable CEs being 4, that is, the request is not satisfied, and a failure response message (that is, a setup failure response) is sent to the base station controller, so as to instruct the base station controller to set up a radio link according to the CE consumption rule of the old board, where an SF32 radio link may be set up.

In an implementation scenario, a private interface field may be added in the message sent to the base station controller to carry the channel element consumption rule of the old board. The embodiments of the present invention are not limited to the manner of adding a private interface field to carry the CE consumption rule of the old board, and all other means for carrying the CE consumption rule of the old board fall within the protection scope of the embodiments of the present invention.

In the method according to the embodiment of the present invention, the CE consumption rule of the old board is carried in the resource status indication message or the audit response message sent to the base station, so as to notify the RNC that new and old baseband boards are mixed at the base station side; when the number of CEs of the base station side satisfies the setup request delivered by the RNC, the actual number of CEs consumed at the base station side is carried in a setup response message sent to the base station, so that the RNC can obtain the actual condition of remaining resources; by maintaining the channel element consumption rule of the old board at the RNC side, when the setup request fails due to insufficient CEs of the old board of the base station side, the RNC, attempts to use the CE consumption rule of the old board to initiate radio link setup, so as to ensure consistency of resources and rules of the base station side in time, thereby avoiding accumulative errors.

Figure 2:
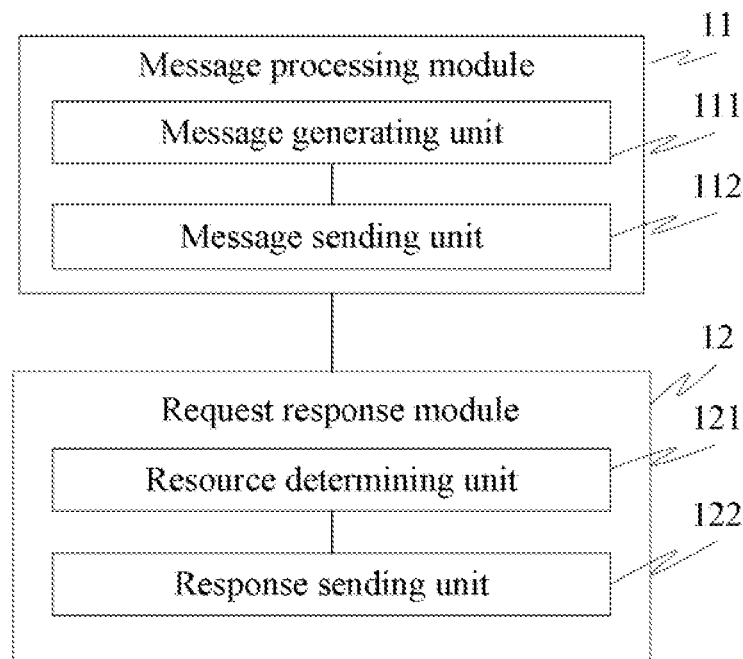
FIG. 2 is a schematic structural diagram of a base station for setting up a radio link according to a specific embodiment of the present invention.

As shown in FIG. 2, based on the method (1) for setting up a radio link from the view of a base station, an embodiment of the present invention provides a base station for setting up a radio link from the view of a base station. The base station may include:

a message processing module 11, configured to send a message to a base station controller, where the message includes channel element consumption rules of a new board and an old board in the base station; and a request response module 12, configured to instruct the base station controller to set up a radio link according to the channel element consumption rule of the old board when it is determined that the actual number of assignable channel elements of the old board does not satisfy a radio link setup request sent according to the channel element consumption rule of the new board by the base station controller.

In an implementation scenario, the message processing module 11 may specifically include:

a message generating unit 111, configured to generate an audit response message that includes the channel element consumption rules of the new board and the old board and is in response to an audit request message received from the base station controller; or configured to generate a resource status indication message including the channel element consumption rules of the new board and the old board after a local cell is established; and a message sending unit 112, configured to send the audit response message or the resource status indication message generated by the message generating unit to the base station controller.

In an implementation scenario, the request response module 12 may specifically include:

a resource determining unit 121, configured to judge, in response to the radio link setup request sent according to the channel element consumption rule of the new board by the base station controller, whether the actual number of assignable channel elements of the old board satisfies the theoretical number of channel elements in the radio link setup request (that is, whether to satisfy the radio link setup request), and when determining, according to the channel element consumption rule of the old board, that the actual number of channel elements required to be consumed for radio link setup is larger than the number of assignable channel elements of the old board, determine that the actual number of assignable channel elements of the old board does not satisfy the radio link setup request; and a response sending unit 122, configured to send a setup failure response to the base station controller when the resource determining unit 121 determines that the actual number of assignable channel elements of the old board does not satisfy the radio link setup request, where the setup failure response carries the actual number of channel elements required to be consumed for radio link setup and a setup failure cause being insufficient channel elements of the old board.

In an implementation scenario, the request response module 12 may be further configured to:

when it is determined, according to the channel element consumption rule of the new board or the old board, that the actual number of channel elements of the new board or the old board required to be consumed for radio link setup is smaller than or equal to the actual number of assignable channel elements of the new board or the old board, determine that the radio link setup request sent according to the channel element consumption rule of the new board or the old board by the base station controller is satisfied; and send a setup success response to the base station controller, where the setup success response includes the actual number of channel elements that are consumed when channel elements of the new board or the old board are used for radio link setup, so that the base station controller uses the actual number of channel elements to replace the theoretical number of channel elements in the radio link setup request, and obtains the actual number of remaining channel elements.

From the view of function implementation, the modules involved in the embodiment of the base station shown in FIG. 2 are one-to-one corresponding to the steps in the method embodiment shown in FIG. 1, and reference may be made to the method embodiment shown in FIG. 1 for specific technical solutions, which will not be described herein again.

The application of the base station according to the embodiment of the present invention can ensure the uniformity of the rule maintained by the RNC side and the resources actually consumed in the base station, thereby solving the problem of accumulative errors in the prior art caused by inconsistency of the rule maintained by the RNC side and the resources actually consumed.

Figure 3:
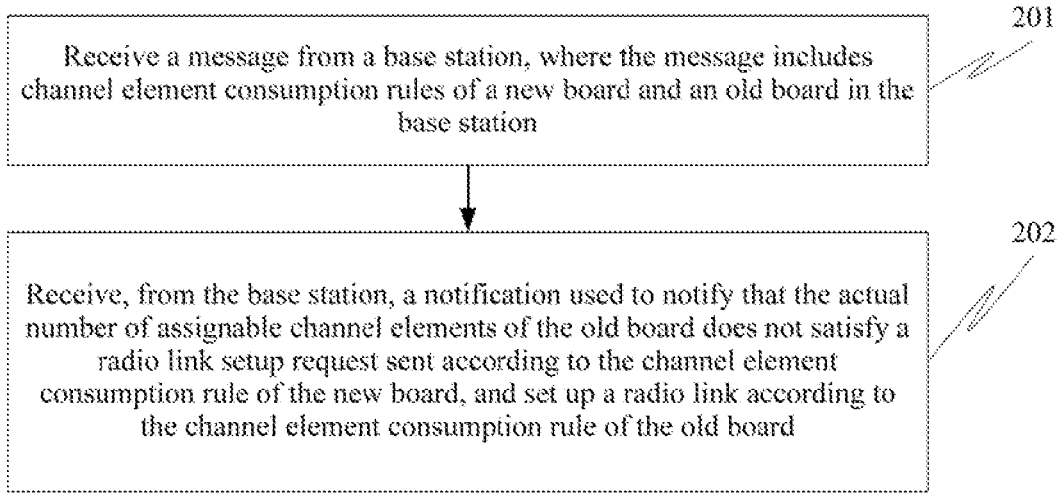
FIG. 3 is a flowchart of a method (2) for setting up a radio link according to a specific embodiment of the present invention.

As shown in FIG. 3, an embodiment of the present invention provides a method (2) for setting up a radio link from the view of a base station controller. Corresponding to the method embodiment of the base station side according to the specific embodiment shown in FIG. 1, the method may include the following steps.

Step 201: Receive a message from a base station, where the message includes channel element consumption rules of a new board and an old board in the base station.

Step 202: Receive, from the base station, a notification used to notify that the actual number of assignable channel elements of the old board does not satisfy a radio link setup request sent according to the channel element consumption rule of the new board, and set up a radio link according to the channel element consumption rule of the old board.

In an implementation scenario, the message received from the base station in step 201 may be corresponding to the message sent in step 101 according to the method embodiment shown in FIG. 1, and reference may be made to the embodiment shown in FIG. 1 for specific technical solutions.

In an implementation scenario, the specific process of step 201 may include:

receiving and saving an audit response message that includes the channel element consumption rules of the new board and the old board and is sent by the base station in response to an audit request message; or receiving and saving a resource status indication message that includes the channel element consumption rules of the new board and the old board and is sent by the base station after a local cell is established.

In an implementation scenario, after step 201 is completed, a radio link setup request is sent to the base station, where the request includes the theoretical number of channel elements required to be consumed for radio link setup and the theoretical number is determined according to the channel element consumption rule of the new board.

In an implementation scenario, the specific process of step 202 may include:

receiving a setup failure response sent by the base station, where the setup failure response is used to indicate that the base station determines, according to the channel element consumption rule of the old board, that the actual number of channel elements required to be consumed is larger than the actual number of assignable channel elements of the old board when the base station uses channel elements of the old board for radio link setup, and the failure response includes the actual number of channel elements and a setup failure cause being insufficient channel elements of the old board; and sending a radio link setup request to the base station, where the request includes the theoretical number of channel elements determined according to the channel element consumption rule of the old board.

In an implementation scenario, the method may further include:

receiving a setup success response sent by the base station, where the setup success response is used to indicate that the actual number of channel elements of the new board or the old board determined by the base station according to the channel element consumption rule of the new board or the old board is smaller than or equal to the actual number of assignable channel elements of the new board or the old board, and the radio link setup request sent according to the channel element consumption rule of the new board or the old board is satisfied, and the setup success response includes the actual number of channel elements that are consumed when the base station uses channel elements of the new board or the old board for radio link setup; that is to way, the setup success response is used to indicate that the actual number of channel elements of the new board determined by the base station according to the channel element consumption rule of the new board is smaller than or equal to the actual number of assignable channel elements of the new board, and the radio link setup request sent according to the channel element consumption rule of the new board is satisfied, and the setup success response includes the actual number of channel elements that are consumed when the base station uses channel elements of the new board for radio link setup; or the setup success response is used to indicate that the actual number of channel elements of the old board determined by the base station according to the channel element consumption rule of the old board is smaller than or equal to the actual number of assignable channel elements of the old board, and the radio link setup request sent according to the channel element consumption rule of the old board is satisfied, and the setup success response includes the actual number of channel elements that are consumed when the base station uses channel elements of the old board for radio link setup;

using the actual number of channel elements to replace the theoretical number of channel elements determined according to the channel element consumption rule of the new board, and obtaining the actual number of remaining assignable channel elements.

As the method according to the embodiment of the present invention is another method for setting up a radio link provided from the view of a base station controller and is corresponding to the embodiment of the method (1) shown in FIG. 1, the technical solution involved in the embodiment of the present invention is corresponding to that involved in the embodiment shown in FIG. 1, and the details will not be described herein again.

The application of the method according to the embodiment of the present invention can avoid the problem of accumulative errors caused by mismatching of rules and resources when mixed insertion of new and old baseband boards occurs in the base station, thereby ensuring correct resource allocation.

Figure 4:
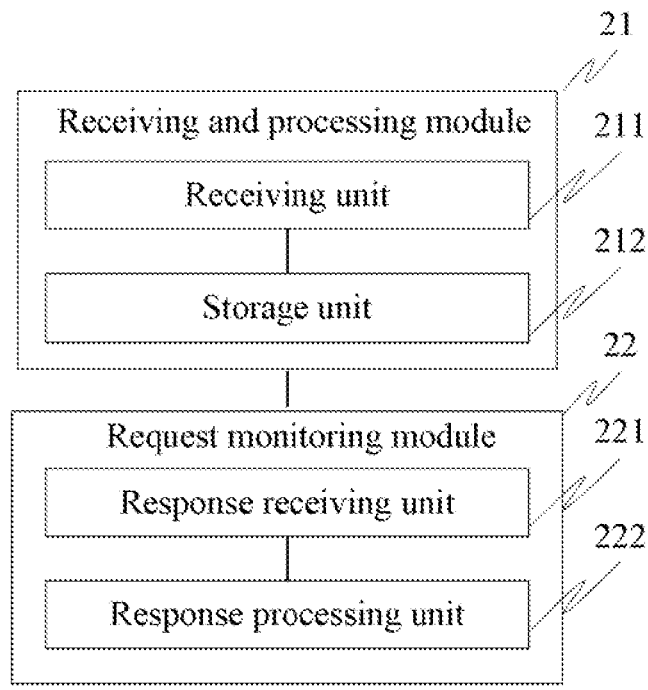
FIG. 4 is a schematic structural diagram of a base station controller for setting up a radio link according to a specific embodiment of the present invention.

As shown in FIG. 4, based on the method (2) for setting up a radio link from the view of a base station controller, an embodiment of the present invention provides a base station controller for setting up a radio link from the view of a base station controller. The base station controller may include:

a receiving and processing module 21, configured to receive a message from a base station, where the message includes channel element consumption rules of a new board and an old board in the base station; and a request monitoring module 22, configured to receive a notification that is sent from the base station and is used to notify that the actual number of assignable channel elements of the old board does not satisfy a radio link setup request sent according to the channel element consumption rule of the new board, and set up a radio link according to the channel element consumption rule of the old board.

In an implementation scenario, the receiving and processing module 21 may specifically include:

a receiving unit 211, configured to receive an audit response message that includes the channel element consumption rules of the new board and the old board and is sent by the base station in response to an audit request message; or configured to receive a resource status indication message that includes the channel element consumption rules of the new board and the old board and is sent by the base station after a local cell is established; and a storage unit 212, configured to store the audit response message or the resource status indication message received by the receiving unit 211.

In an implementation scenario, the request monitoring module 22 may specifically include:

a response receiving unit 221, configured to receive a setup failure response sent by the base station, where the setup failure response is used to indicate that the actual number of channel elements determined by the base station according to the channel element consumption rule of the old board when the base station uses channel elements of the old board for radio link setup is larger than the actual number of assignable channel elements of the old board, and the failure response includes the actual number of channel elements and a setup failure cause being insufficient channel elements of the old board; and a response processing unit 222, configured to send a radio link setup request to the base station after the response receiving unit 221 receives the failure response, where the request includes the theoretical number of channel elements determined according to the channel element consumption rule of the old board.

In an implementation scenario, the request monitoring module 22 may be specifically configured to:

receive a setup success response sent by the base station, where the setup success response is used to indicate that the actual number of channel elements of the new board or the old board, where the channel elements are required to be consumed and the actual number of channel elements is determined by the base station according to the channel element consumption rule of the new board or the old board, is smaller than or equal to the actual number of assignable channel elements of the new board or the old board, and the radio link setup request sent according to the channel element consumption rule of the new board or the old board is satisfied, and the setup success response includes the actual number of channel elements that are consumed when the base station uses channel elements of the new board or the old board for radio link setup; that is to say, the setup success response is used to indicate that the actual number of channel elements of the new board, where the channel elements are required to be consumed and the actual number of channel elements is determined by the base station according to the channel element consumption rule of the new board, is smaller than or equal to the actual number of assignable channel elements of the new board, and the radio link setup request sent according to the channel element consumption rule of the new board is satisfied, and the setup success response includes the actual number of channel elements that are consumed when the base station uses channel elements of the new board for radio link setup; or the setup success response is used to indicate that the actual number of channel elements of the old board, where the channel elements are required to be consumed and the actual number of channel elements is determined by the base station according to the channel element consumption rule of the old board, is smaller than or equal to the actual number of assignable channel elements of the old board, and the radio link setup request sent according to the channel element consumption rule of the old board is satisfied, and the setup success response includes the actual number of channel elements that are consumed when the base station uses channel elements of the old board for radio link setup; and according to the setup success response sent by the base station, use the actual number of channel elements consumed to replace the theoretical number of channel elements determined according to the channel element consumption rule of the new board, and obtain the actual number of remaining assignable channel elements.

For specific technical solutions involved in the embodiment of the present invention, reference may be made to the method embodiment shown in FIG. 3, and the details will not be described herein again.

The application of the base station controller according to the embodiment of the present invention avoids the problem of accumulative errors caused by mismatching of rules and resources when mixed insertion of new and old baseband boards occurs in the base station.

Figure 5:
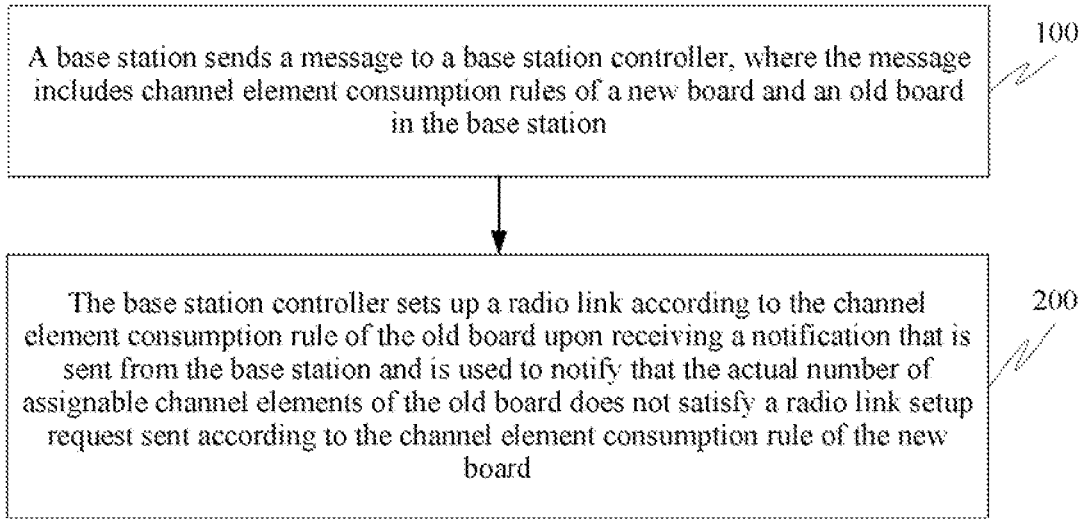
FIG. 5 is a flowchart of a method (3) for setting up a radio link according to a specific embodiment of the present invention.

As shown in FIG. 5, based on the method embodiments shown in FIG. 1 and FIG. 3, a specific embodiment of the present invention provides a method for setting up a radio link from the view of a system for setting up a radio link A method (3) for setting up a radio link provided in a specific embodiment of the present invention adopts the following technical solution:

Step 100: A base station sends a message to a base station controller, where the message includes channel element consumption rules of a new board and an old board in the base station.

Step 200: The base station controller sets up a radio link according to the channel element consumption rule of the old board upon receiving a notification that is sent from the base station and is used to notify that the actual number of assignable channel elements of the old board does not satisfy a radio link setup request sent according to the channel element consumption rule of the new board.

In an implementation scenario, the technical solution of this embodiment includes the technical solutions of the method embodiments corresponding to FIG. 1 and FIG. 3, and reference may be made to relevant content of the above specific embodiments for details, which will not be described herein again.

The application of the specific embodiment of the present invention desirably ensures the uniformity of resource allocation of the base station side and the base station controller side when mixed insertion of new and old baseband boards occurs in the base station, thereby avoiding the problem of accumulative errors caused by mismatching of the channel elements of the old board and the channel element consumption rule of the new board in the base station.

Figure 6:
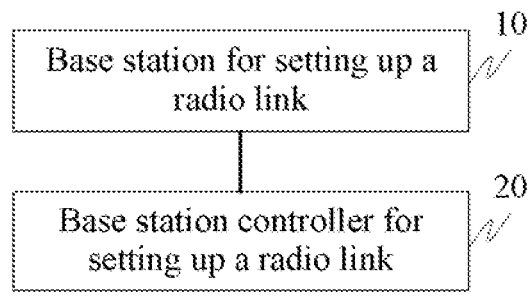
FIG. 6 is a schematic structural diagram of a system for setting up a radio link according to a specific embodiment of the present invention.

As shown in FIG. 6, a specific embodiment of the present invention provides a system for setting up a radio link, which is obtained on the basis of the method embodiment shown in FIG. 5. In an implementation scenario, the system includes the base station 10 for setting up a radio link as shown in FIG. 2 and the base station controller 20 for setting up a radio link as shown in FIG. 4, and reference may be made to relevant content of the specific embodiments shown in FIG. 2 and FIG. 4 for details, which will not be described herein again.

To better illustrate the technical solutions of the present invention, specific embodiments are illustrated below.

Embodiment 1 of the Present Invention

Figure 7:
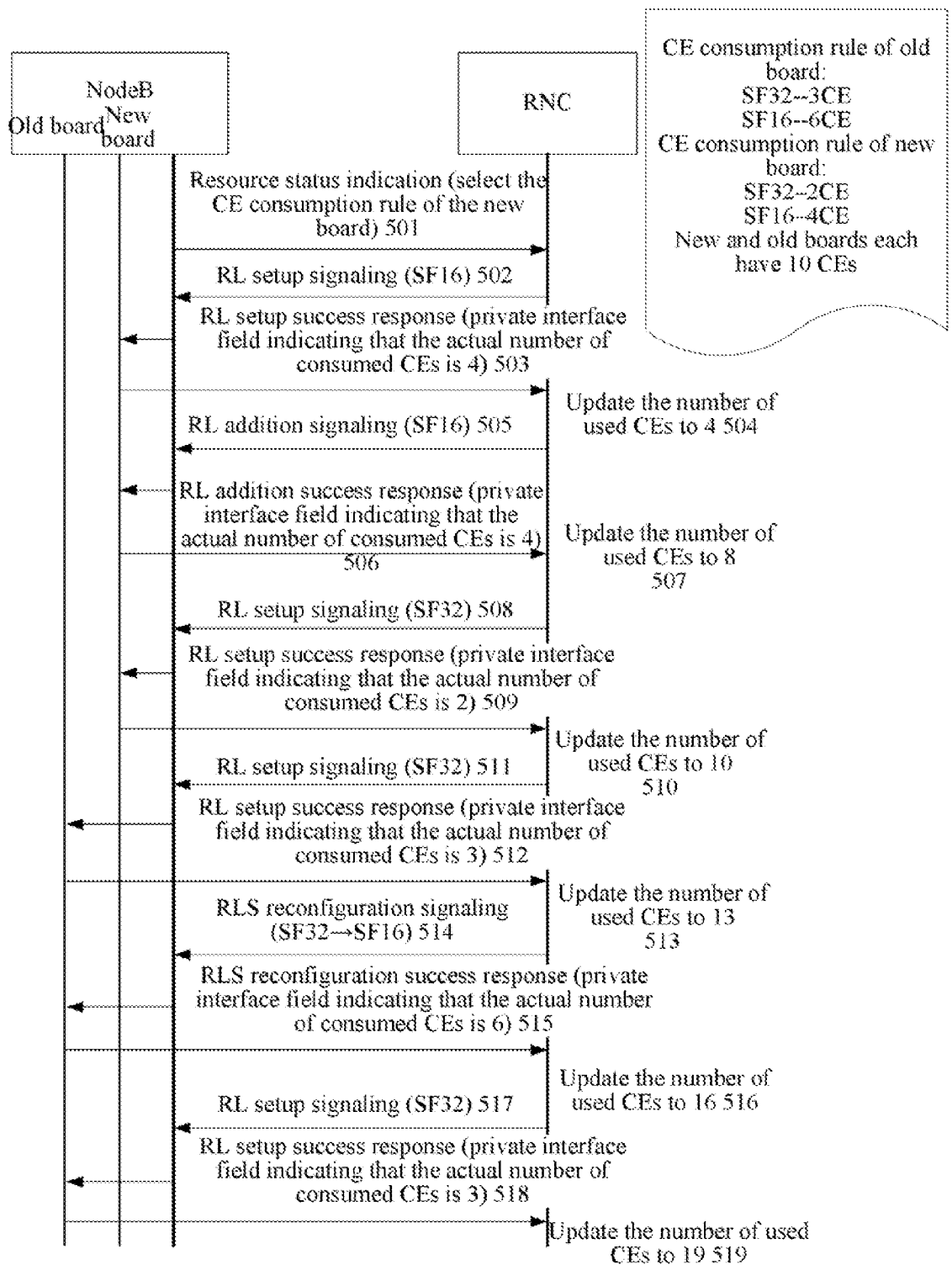
FIG. 7 is a flowchart of a method for setting up a radio link according to Embodiment 1 of the present invention.

As shown in FIG. 7, the embodiment of the present invention is illustrated through an example that CE consumption rules of a new board and an old board of a base station are carried in a resource status indication message sent by the base station to a base station controller.

Step 501: A NodeB reports a resource status indication message to an RNC, where the message carries CE consumption rules of a new board and an old board of a base station.

In an implementation scenario, when mixed insertion of new and old baseband boards occurs in the base station, an E-DCH CE consumption rule of the new baseband board is selected according to the principle of highest processing capability and reported to the RNC; the CE consumption rule of the old board may be sent to the RNC by adding a private interface field in the message.

Step 502: The RNC receives the resource status indication message, and sends a request of setting up an SF16 RL (radio link), that is, a radio link setup request of setting up an SF16 RL, to the NodeB according to the CE consumption rule of the new board.

Specifically, the RNC saves the resource status indication message, and maintains the new and old CE consumption rules. For example, the RNC learns, according to the resource status indication message reported by the NodeB, that the NodeB has a total of 20 CEs (the new and old boards each have 10 CEs), and preferentially selects the CE consumption rule of the new board and considers to use the rule in full configuration.

Step 503: The NodeB receives an SF16 RL signaling, and returns a setup success response message (that is, setup success response).

After receiving the SF16 RL signaling message, the NodeB preferentially selects to set up the RL on the new baseband board, determines, according to the CE consumption rule of the new baseband board, that the actual number of CEs consumed for setup of SF16 is 4, which is smaller than the actual number of assignable CEs of the new board being 10, indicating that the SF16 RL request is satisfied. Then, a setup success response is fed back to the RNC, and the actual number of CEs consumed for setup of SF16 being 4 is carried by adding a private interface field in the setup success response message (that is, the setup success response).

Step 504: The RNC uses the actual number of CEs being 4 in the private interface field to update the number of consumed CEs to 4, according to the received setup success response.

As the base station preferentially uses the new baseband board for radio link setup, the theoretical number of CEs determined according to the CE consumption rule of the new board is equal to the actual number of CEs consumed at the base station side (the CE number being 4).

Step 505: The RNC delivers an RL addition signaling to add an SF16 RL.

Step 506: The NodeB preferentially selects to set up the RL on the new baseband board, and returns a setup success response.

A private interface field in the setup success response carries the actual number of CEs consumed for setup of SF16 being 4 which is determined by the base station according to the CE consumption rule of the new and the actual number of CEs being 4 is smaller than the actual number of remaining assignable CEs of the new board being 6.

Step 507: The RNC uses the actual number of CEs being 4 in the private interface field to update the number of consumed CEs to 8, according to the setup success response received from the NodeB.

Step 508: The RNC delivers an RL setup signaling, that is, a radio link setup request, to set up an SF32 RL.

Step 509: The NodeB preferentially selects to set up the RL on the new baseband board, and returns a setup success response.

A private interface field in the setup success response carries the actual number of CEs consumed for setup of SF32 being 2 which is determined according to the CE consumption rule of the new board, and the actual number of CEs being 2 is equal to the number of CEs of the new board being 2.

Step 510: The RNC uses the actual number being 2 in the private interface field to update the number of consumed CEs to 10, according to the received setup success response.

Step 511: The RNC delivers an RL setup signaling, to set up an SF32 RL.

Step 512: As all CE resources on the new baseband board are consumed, the NodeB selects to set up the RL on the old baseband board, and returns a setup success response according to the CE consumption rule of the old baseband board.

A private interface field in the response message carries the actual number of CEs consumed for setup of SF32 being 3 which is determined by the base station according to the consumption rule of the old board, and the actual number of CEs being 3 is smaller than the actual number of assignable CEs of the old board being 10.

Step 513: The RNC uses the actual number of CEs being 3 in the private interface field to update the number of consumed CEs to 13, according to the received setup success response.

The theoretical number of consumed CEs determined by the RNC side according to the CE consumption rule of the new board is 2, so that if the actual number of consumed CEs is not used to update the theoretical number of consumed CEs, accumulative errors are caused. The application of the embodiment of the present invention avoids this problem.

Step 514: The RNC delivers an RLS reconfiguration signaling, to reconfigure an RL, which is set up previously, from SF32 to SF16.

Step 515: A resource management module of the NodeB selects to reconfigure an SF16 RL on the old baseband board, and returns a setup success response according to the CE consumption rule of the old baseband board.

A private interface field in the setup success response carries the actual number of CEs consumed for setup of SF32 being 6 which is determined by the base station according to the CE consumption rule of the old board, and the actual number of CEs being 6 is smaller than the actual number of remaining assignable CEs of the old board being 10 (the number of CEs required to be consumed for setup of SF16 in the CE consumption rule of the old baseband board is 6, and the number of CEs required to be consumed for setup of SF16 on the new baseband board is 4).

Step 516: The RNC uses the actual number being 6 in the private interface field to update the number of consumed CEs to 16, according to the received setup success response.

Step 517: The RNC delivers an RL setup signaling, that is, a radio link setup request, to set up an SF32 RL.

Step 518: The NodeB selects to set up the RL on the old baseband board, and returns a setup success response according to the CE consumption rule of the old baseband board.

A private interface field in the setup success response carries the actual number of CEs consumed for setup of SF32 being 3 which is determined by the base station according to the CE consumption rule of the old board, and the actual number of CEs being 3 is smaller than the number of remaining CEs of the old board being 4 (the number of CEs required to be consumed for setup of SF32 is 3 in the CE consumption rule of the old baseband board, and is 4 in the CE consumption rule of the new baseband board).

Step 519: The RNC uses the actual number of CEs being 3 in the private interface field to update the number of consumed CEs to 19, according to the received setup success response.

Step 520: The RNC detects that the number of used CEs is 19 and no more SF32 or SF16 RL setup requests can be satisfied, and accordingly, setup of an RL is no longer initiated.

If the method according to the embodiment of the present invention is not used, the RNC can only set up or reconfigure an RL according to the CE consumption rule reported by the NodeB (the CE consumption rule of the new baseband board), and uses the CE consumption rule of the new baseband board for matching even if CEs on the old baseband board are used. In this way, after the above 19 steps are completed, it is determined that there are still 4 idle CEs in the NodeB (in fact, the remaining CEs on the new and old baseband boards do not allow admission any more), and therefore admission of new RLs in the NodeB may be allowed; however, at this time, neither the new baseband board nor the old baseband board in the NodeB can provide CEs required for admission of one RL, resulting in false admission.

If can be seen from the above embodiments that the channel element consumption rule of the old board carried in the resource status indication message sent to the base station controller is not used, because in Embodiment 1, a case, in which the base station determines that the channel elements of either the new board or the old board in the base station can satisfy the setup request after the base station receives the radio link setup request delivered by the base station controller, is used as an application scenario of this embodiment, and Embodiment 2 may clearly illustrate the process of using the channel element consumption rule of the old board.

As the channel element consumption rule of the old board carried in the resource status indication message sent by the base station controller is not used in the above embodiment, step 501 may be omitted, and in the case where the base station determines that the channel elements of either the new board or the old board in the base station can satisfy the setup request after the base station receives the radio link setup request delivered by the base station controller, the actual number of consumed CEs may still be carried in the setup success response returned to the base station controller, so as to enable the base station controller to learn the actual number of available CEs.

Embodiment 2 of the Present Invention

Figure 8:
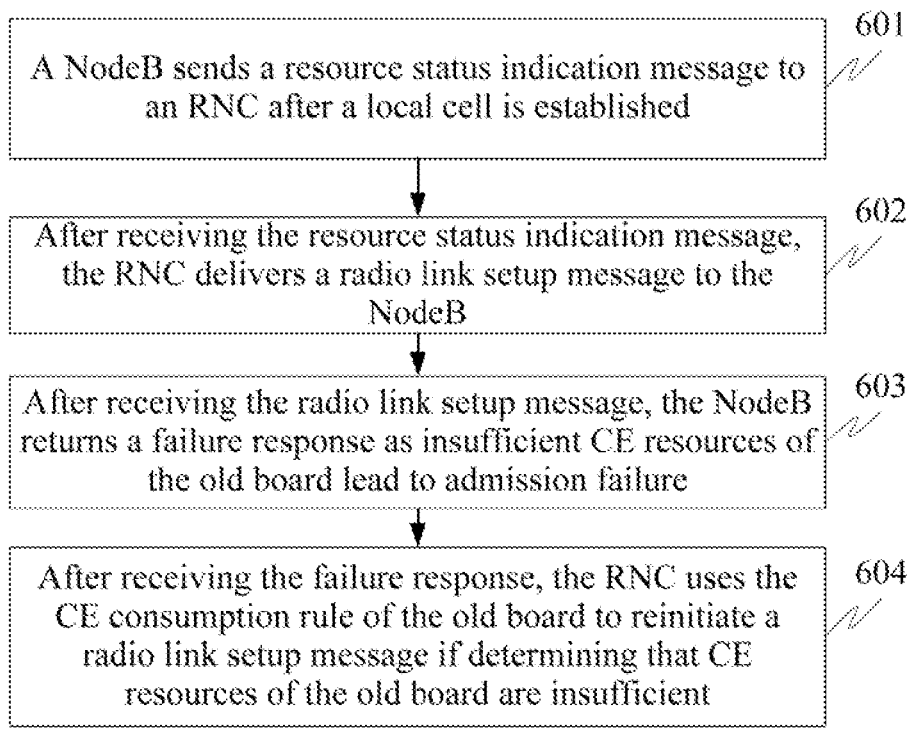
FIG. 8 is a flowchart of a method for setting up a radio link according to Embodiment 2 of the present invention.

As shown in FIG. 8, the embodiment of the present invention is illustrated through an example that a base station sends a resource status indication message to a base station controller, and is another application scenario of Embodiment 1.

Embodiment 2 is different from Embodiment 1 in that, when the base station controller send a setup request to the base station according to the channel element consumption rule of the new board, and the actual number of assignable channel elements of the old board of the base station side is insufficient for setup of a radio link (the actual number of CEs, where the CEs are required to be consumed and the actual number of CEs is determined according to the channel element consumption rule of the old board, is larger than the number of channel elements of the old board), a setup failure response is sent to the base station controller.

A specific process is as follows.

Step 601: A NodeB actively sends a resource status indication message to an RNC after a local cell is established, where the message carries a channel element consumption rule of an old board.

In the embodiment of the present invention, a private interface field is added in the resource status indication message to carry the CE consumption rule of the old board for reporting to the RNC.

Step 602: After receiving the resource status indication message sent by the NodeB, the RNC delivers a radio link setup message according to a CE consumption rule of a new board.

Step 603: After receiving the radio link setup message, the NodeB returns a setup failure response carrying a failure cause being insufficient CE resources of the old board when the NodeB determines that the actual number of assignable CEs of the old board is insufficient.

After the NodeB receives the radio link setup message delivered by the RNC, when the number of CEs of the new board or the old board maintained by the NodeB is larger than or equal to the actual number of CEs that is specified according to channel elements of the old board, the NodeB feeds back a success response message to the RNC, carries the actual number of CEs, consumed while admission is allowed, in the success response message, uses the actual number of CEs consumed to replace the theoretical number of CEs determined by the RNC side according to the CE consumption rule of the new board, and determines the actual number of remaining CEs (which is the same as the technical solution described in Embodiment 1).

When the NodeB uses CEs of the old board, and determines, according to the CE consumption rule of the old board, that the actual number of consumed CEs is larger than the number of CEs of the old board, the NodeB feeds back a failure response message to the RNC, and carries, in the failure response message, the actual number of CEs required to be consumed and a failure cause being insufficient CEs of the old board.

Step 604: The RNC checks the failure cause after receiving the failure response, and if determining that the actual number of assignable CE resources of the old board is insufficient, the RNC attempts to use a maintained CE consumption rule of the old board to reinitiate a radio link setup message.

The embodiment of the present invention clearly illustrates another special condition of Embodiment 1, and in an application scenario where insufficient resources of the old board leads to admission failure, the importance of maintaining both the new and old CE consumption rules at the base station controller is indicated, and the uniformity of resources of the base station side and the controller side is ensured.

Embodiment 3 of the Present Invention

Figure 9:
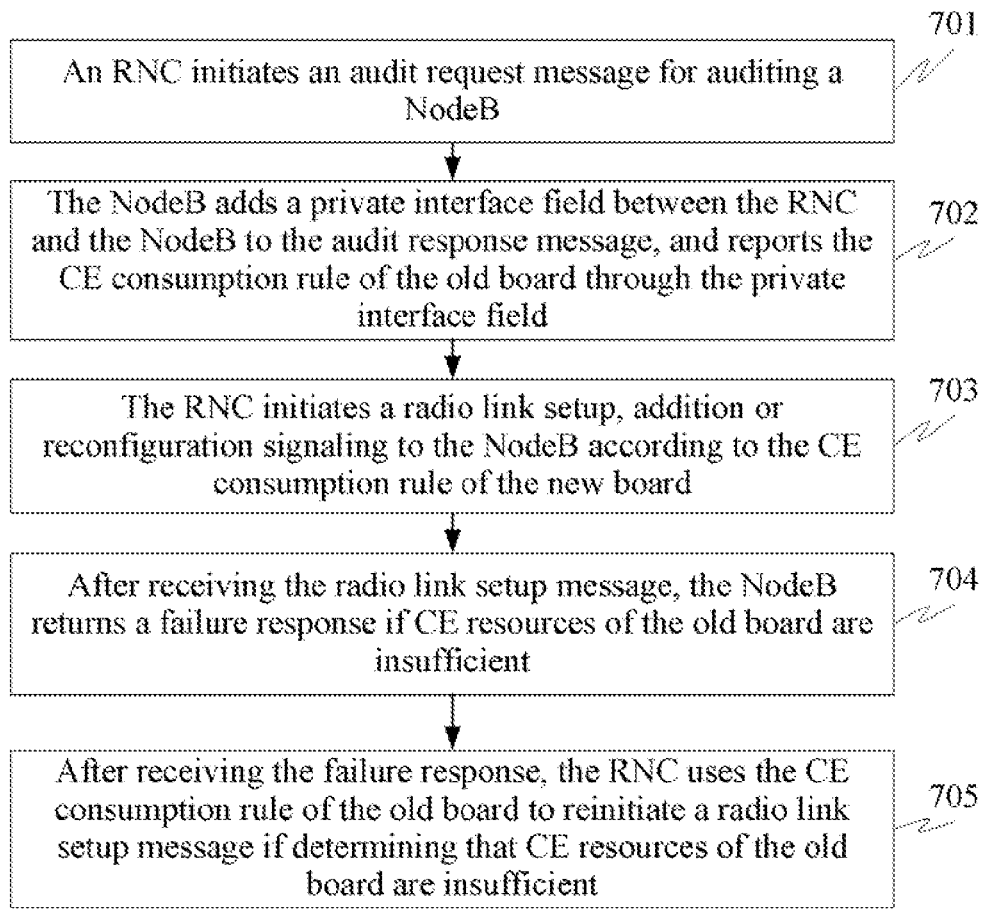
FIG. 9 is a flowchart of a method for setting up a radio link according to Embodiment 3 of the present invention.

As shown in FIG. 9, the embodiment of the present invention is illustrated through an example that a base station sends an audit response message to a base station controller. The technical solution involved in this embodiment is the same as the technical solutions involved in Embodiment 1 and Embodiment 2.

When resources and capabilities of a NodeB change, a private interface field is added in an audit response message in response to an audit request message delivered by an RNC. A specific process is as follows.

Step 701: An RNC initiates an audit request message for auditing a NodeB.

Step 702: The NodeB adds a private interface field between the RNC and the NodeB to the audit response message, and if new and old baseband boards have different CE consumption rules, reports the CE consumption rule of the old board through the private interface field.

Step 703: The RNC initiates a radio link setup message to the NodeB according to the CE consumption rule of the new board.

Step 704: After receiving the radio link setup message, the NodeB returns a setup failure response carrying a failure cause being insufficient CE resources of the old board when the NodeB determines that the actual number of assignable CE resources of the old board is insufficient (which is the same as the technical solution described in Embodiment 2, and the details will not be described herein again).

When channel elements of the new board or the old board in the base station satisfies the setup request of the RNC (the actual number of CEs, where the CEs are required to be consumed and the actual number of CEs is determined according to the channel element consumption rule of the new board or the old board, is smaller than or equal to the number of channel elements of the new board or the old board, that is, the actual number of CEs, where the CEs are required to be consumed and the actual number of CEs is determined according to the channel element consumption rule of the new board, is smaller than or equal to the number of channel elements of the new board, or the actual number of CEs, where the CEs are required to be consumed and the actual number of CEs is determined according to the channel element consumption rule of the old board, is smaller than or equal to the number of channel elements of the old board), a setup success response is fed back, which is the same as the technical solution involved in Embodiment 1.

Step 705: The RNC checks the failure cause after receiving the failure response, and if the RNC determines that the actual number of assignable CE resources of the old board is insufficient, attempts to use a maintained CE consumption rule of the old board to reinitiate a radio link setup message.

The application of the method according to Embodiment 3 of the present invention ensures the uniformity of resources of the base station side and the base station controller side, thereby solving the problem of false admission resulting from accumulative errors.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a Read-Only Memory (Read-Only Memory, ROM), a Random Access Memory (Read-Only Memory, RAM), or the like.

The above descriptions are merely exemplary embodiments of the present invention, but not intended to limit the protection scope of the present invention. Any variations or replacements that can be easily thought of by persons skilled in the art within the technical scope of the present invention shall fall within the protection scope of the present invention. Therefore, the protection scope of the invention is subject to the protection scope of the claims.

What is claimed is:

1. A method for setting up a radio link, comprising:
   sending, by a base station, a message to a base station controller, wherein the message comprises channel element consumption rules of a new baseband board and an old baseband board in the base station;
   receiving, by the base station, a radio link setup request from the base station controller, wherein the radio link setup request is in accordance with the channel element consumption rule of the new baseband board;
   determining, by the base station, whether a quantity of assignable channel elements of the old baseband board satisfies the radio link setup request received from the base station controller; and
   instructing, by the base station, the base station controller to set up a radio link in accordance with the channel element consumption rule of the old baseband board when determining that the quantity of assignable channel elements of the old baseband board does not satisfy the radio link setup request.

2. The method according to claim 1, wherein the message is an audit response message or a resource status indication message, wherein the audit response message is a message generated in response to an audit request message received from the base station controller and the resource status indication message is a message generated after a local cell is established.

3. The method according to claim 1, wherein the determining that the quantity of assignable channel elements of the old baseband board in the base station does not satisfy the radio link setup request comprises:

through determining, in accordance with the channel element consumption rule of the old baseband board, that a quantity of channel elements required to be consumed for radio link setup is larger than the quantity of assignable channel elements of the old baseband board, determining that the quantity of assignable channel elements of the old baseband board in the base station does not satisfy the radio link setup request.

4. The method according to claim 1, wherein the instructing the base station controller to set up the radio link in accordance with the channel element consumption rule of the old baseband board comprises:

sending a setup failure response to the base station controller, wherein the setup failure response carries a quantity of channel elements required to be consumed for the radio link setup and a setup failure cause being insufficient channel elements of the old baseband board.

5. The method according to claim 1, further comprising:

sending a setup success response to the base station controller, wherein the setup success response comprises a quantity of channel elements consumed when channel elements of the new baseband board or the old baseband board are used for the radio link setup, so that the base station controller uses the quantity of channel elements consumed to obtain a quantity of remaining assignable channel elements when determining that the radio link setup request is satisfied.

6. The method according to claim 5, wherein the determining that the radio link setup request is satisfied comprises:

determining that the radio link setup request is satisfied, through determining, in accordance with the channel element consumption rule of the new baseband board, that a quantity of channel elements of the new baseband board required to be consumed for the requested radio link setup is smaller than or equal to a quantity of assignable channel elements of the new baseband board, or through determining, in accordance with the channel element consumption rule of the old baseband board, that the quantity of channel elements of the old baseband board required to be consumed for the requested radio link setup is smaller than or equal to the quantity of assignable channel elements of the old baseband board.

7. A base station, comprising:

a message sending unit, configured to send a message to a base station controller, wherein the message comprises channel element consumption rules of a new baseband board and an old baseband board in the base station; and a resource determining unit, configured to determine whether a quantity of assignable channel elements of the old baseband board satisfies a radio link setup request received from the base station controller wherein the radio link setup request is in accordance with the channel element consumption rule of the new baseband board; and a response sending unit, configured to instruct the base station controller to set up a radio link in accordance with the channel element consumption rule of the old baseband board when the quantity of assignable channel elements of the old baseband board does not satisfy the radio link setup request.

8. The base station according to claim 7, wherein the base station further comprises:

a message generating unit, configured to generate the message that comprises the channel element consumption rules of the new baseband board and the old baseband board, wherein the message is an audit response message which is in response to an audit request message received from the base station controller, or a resource status indication message generated after a local cell is established.

9. The base station according to claim 7, wherein the resource determining unit is configured to determine that the quantity of assignable channel elements of the old baseband board does not satisfy the radio link setup request through determining that a quantity of channel elements required to be consumed for the requested radio link setup is larger than the quantity of assignable channel elements of the old baseband board; and the response sending unit is configured to send a setup failure response to the base station controller when the resource determining unit determines that the quantity of assignable channel elements of the old baseband board does not satisfy the radio link setup request, wherein the setup failure response carries the quantity of channel elements required to be consumed for the requested radio link setup and a setup failure cause being insufficient channel elements of the old baseband board.

10. The base station according to claim 7, wherein the resource determining unit is further configured to determine that the radio link setup request sent in accordance with the channel element consumption rule of the new baseband board by the base station controller is satisfied; and the response sending unit is further configured to sending a setup success response to the base station controller, wherein the setup success response comprises a quantity of channel elements consumed when channel elements of the new baseband board or the old baseband board are used for the requested radio link setup, so that the base station controller obtains a quantity of remaining channel elements in the base station in accordance with the quantity of the channel elements consumed.

11. The base station according to claim 10, wherein the resource determining unit is configured to determine that the radio link setup request is satisfied through determining, in accordance with the channel element consumption rule of the new baseband board, that a quantity of channel elements of the new baseband board required to be consumed for the radio link setup is smaller than or equal to a quantity of assignable channel elements of the new baseband board, or through determining, in accordance with the channel element consumption rule of the old baseband board, that a quantity of channel elements of the old baseband board required to be consumed for the radio link setup is smaller than or equal to the quantity of assignable channel elements of the old baseband board.

12. A method for setting up a radio link, comprising:

receiving, by a base station controller, a message from a base station, wherein the message comprises channel element consumption rules of a new baseband board and an old baseband board in the base station;

sending, by the base station controller, a radio link setup request to the base station, wherein the radio link setup request is in accordance with the channel element consumption rule of the new baseband board;

receiving, by the base station controller, from the base station, a notification used to notify that a quantity of assignable channel elements of the old baseband board in the base station does not satisfy the radio link setup request; and setting up, by the base station controller, a radio link in accordance with the channel element consumption rule of the old baseband board in response to the notification received from the base station.

13. The method according to claim 12, wherein the message from the base station is an audit response message that is sent by the base station in response to an audit request message, or a resource status indication message that is sent by the base station after a local cell is established.

14. The method according to claim 12, wherein the receiving, from the base station, the notification used to notify that the quantity of assignable channel elements of the old baseband board does not satisfy the radio link setup request comprises:

receiving a setup failure response from the base station, wherein the setup failure response is used to indicate that the base station determines, in accordance with the channel element consumption rule of the old baseband board, that a quantity of channel elements required to be consumed is larger than the quantity of assignable channel elements of the old baseband board when using channel elements of the old baseband board for the requested radio link setup, and the failure response comprises the quantity of channel elements required to be consumed and a setup failure cause being insufficient channel elements of the old baseband board.

15. The method according to claim 12, wherein the setting up the radio link in accordance with the channel element consumption rule of the old baseband board comprises:

sending a radio link setup request to the base station, wherein the request comprises a quantity of channel elements determined in accordance with the channel element consumption rule of the old baseband board.

16. The method according to claim 12, further comprising:

receiving, by the base station controller, a setup success response sent by the base station, wherein the setup success response is used to indicate that the radio link setup request is satisfied, and the setup success response comprises a quantity of channel elements consumed when the base station uses channel elements of the new baseband board or the old baseband board for the requested radio link setup; and using the quantity of channel elements consumed to obtain a quantity of remaining assignable channel elements in the base station.

17. A base station controller, comprising:

a receiving unit, configured to receive a message from a base station, wherein the message comprises channel element consumption rules of a new baseband board and an old baseband board in the base station; and a response receiving unit, configured to receive, from the base station, a notification used to notify that a quantity of assignable channel elements of the old baseband board in the base station does not satisfy a radio link setup request sent in accordance with the channel element consumption rule of the new baseband board by the base station controller, and a response processing unit, configured to set up a radio link in accordance with the channel element consumption rule of the old baseband board in response to the notification received from the base station.

18. The base station controller according to claim 17, wherein the message received by the receiving unit is an audit response message that is sent by the base station in response to an audit request message, or a resource status indication message that is sent by the base station after a local cell is established; and the base station controller further comprises a storage unit, configured to store the audit response message or the resource status indication message received by the receiving unit.

19. The base station controller according to claim 17, wherein the notification received by the response receiving unit is a setup failure response received from the base station, wherein the setup failure response is used to indicate that a quantity of channel elements required to be consumed is larger than the quantity of assignable channel elements of the old baseband board when using channel elements of the old baseband board for the requested radio link setup, and the failure response comprises the quantity of channel elements required to be consumed and a setup failure cause being insufficient channel elements of the old baseband board; and the response processing unit is configured to set up the radio link through sending a radio link setup request to the base station after the response receiving unit receives the failure response, wherein the request comprises a quantity of channel elements determined in accordance with the channel element consumption rule of the old baseband board.

20. The base station controller according to claim 17, wherein the response receiving unit is further configured to:

receive a setup success response sent by the base station, wherein the setup success response is used to indicate that the radio link setup request is satisfied, and the setup success response comprises a quantity of channel elements consumed when the base station uses channel elements of the new baseband board or the old baseband board for the requested radio link setup; and the response processing unit is further configured to use the quantity of channel elements consumed to obtain a quantity of remaining assignable channel elements in the base station.

* * * * *